May 19, 1964 A. K. JENSEN 3,134,028
MONOPULSER UTILIZING A MINORITY CARRIER STORAGE DIODE
Filed Dec. 23, 1960
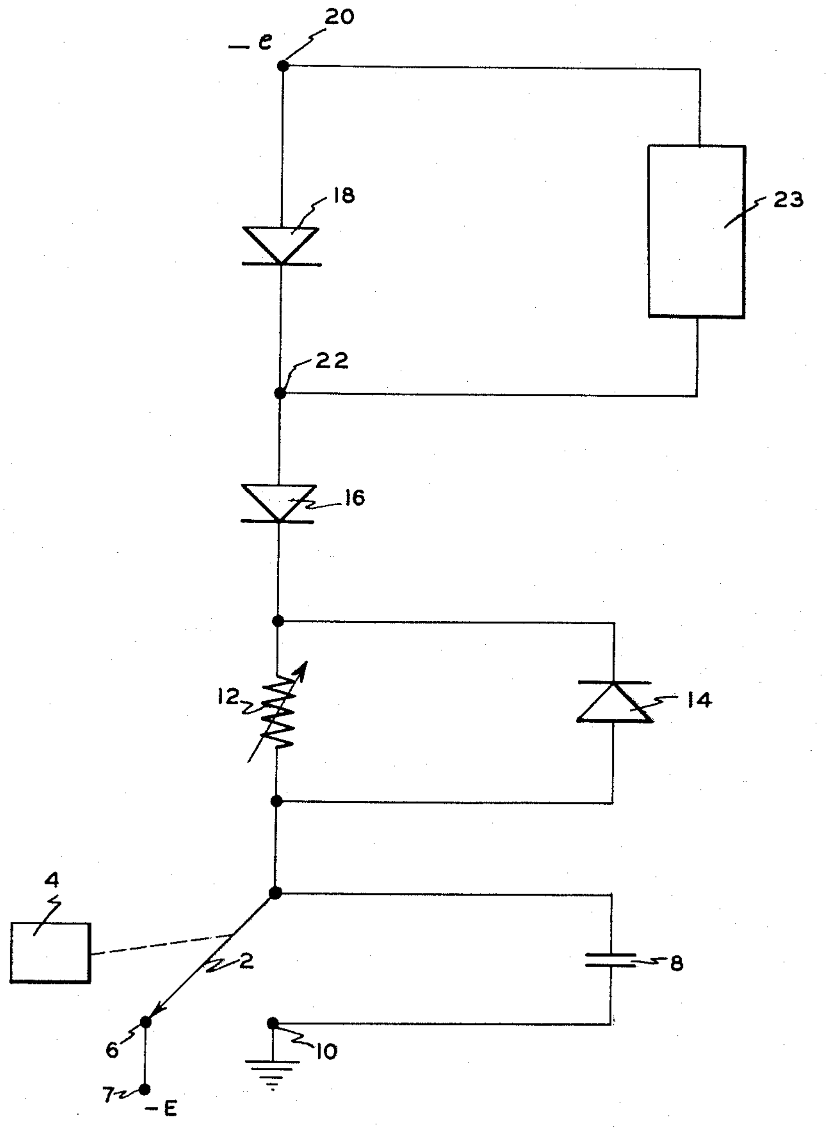
INVENTOR.
ALAN K. JENSEN
BY Charles L. Johnson Jr.
ATTORNEY United States Patent Office 3,134,028 Patented May 19, 1964

3,134,028 MONOPULSER UTILIZING A MINORITY CARRIER STORAGE DIODE

Alan K. Jensen, Dover, N.J., assignor to Monroe Calculating Machine Company, a corporation of Delaware Filed Dec. 23, 1960, Ser. No. 77,943
6 Claims. (Cl. 307—88.5)

This invention relates generally to electronic pulse circuits and more particularly to monopulser circuits for generating a single pulse.

In the application of both manual and automatic keyboards as well as other switching drive mechanisms, difficulties often arise which are caused by the bounce or vibration of various control members. More specifically, electronic keyboard circuits which act as the input medium for electronic computers are often required to provide a single electrical pulse even though the mechanical portion of the apparatus is incapable of a single activation without bounce or chatter. The bounce of chatter of course generates spurious signals to provide erroneous information and indications to the computer. It is to the solution of this and other problems that this invention is directed.

Often it is desired to provide a single output pulse upon the occurrence of an event which is evidenced by the closing of a contact, switch or other device.

It is therefore an object of this invention to provide a pulse generator for producing a single signal upon the activation of control contacts.

It is a further object of the invention to provide an electronic circuit for generating a single pulse upon the closing of contacts notwithstanding key bounce or contact chatter.

Previous attempts to cope with the problem have resulted in the application of flip-flop circuits or other multivibrator type of arrangements. The expense and physical size of such an arrangement is high and in many applications becomes prohibitive.

In the preferred embodiment of the invention the key of a keyboard is serially connected with a resistor-diode parallel combination, storage diode, and blocking diode between unequal potential sources. An important feature is that upon activation of the key, reverse current through the storage diode generates an output pulse which flows until the carriers in the storage diode are dissipated.

The aforementioned objects and novel features of the invention as well as others are set forth in the appended claims and the invention as to its organization and its mode of operation will best be understood from a consideration of the following detailed description of the preferred embodiment when used in connection with the accompanying drawings which are hereby made a part of the specification, and in which:

The figure is a schematic representation of the pulse circuit according to the invention.

In the following detailed description of the apparatus by which the objects of the invention are realized, it should be noted that the switch 2 may be representative of the manual keyboard type or may equally well desinate a remote or automatic type of switch. A relay contact for instance may be the physical apparatus used as switch 2 in the practice of the invention.

To reiterate briefly, one of the purposes of the invention is to provide a single narrow pulse from the contacts of a switch or relay in a pulse control system. This is accomplished by utilizing the stored carriers of a storage diode in conjunction with reversal of potential polarity by the switch contacts.

Referring now to the figure, the switch 2 is activated by the drive source 4 which may be an electromagnetic force in the case of a relay or may be a direct force in the case of a manual keyboard key. The switch arm is shown making contact with the normally closed contact 6, which is returned to potential source 7, while a capacitor 8 is connected between the arm of switch 2 and the normally open contact 10 which is here returned to ground potential. Serially connected with the arm of switch 2 is shown the parallel combination of variable impedance 12 and blocking diode 14. In turn, in series with this parallel arrangement is the storage diode 16, blocking diode 18 and potential source 20. The output for the load 23 is taken at junction 22 across the element 18.

In one embodiment, potential source 7 provided a −24 v. D.C. while potential source 20 was connected so as to apply −6 v. D.C. to the diode 18. The values of other components may be as follows for a switch contact transfer time of 5 milliseconds:

| | |
|---|---|
| 8 | 50 μμf. |
| 12 | 1K ohms. |
| 14 | HD2205. |
| 16 | 1N91. |
| 18 | 1N636. |

Diodes are generally selected so that element 14 is of the high conductance type, 16 should normally have a long storage time and 18 would be of the high speed classification.

Referring to the figure, with the switch in the normally closed position as shown, forward current flows from the −6 v. source 20 through diodes 18 and 16, impedance 12, arm 2 to the −24 v. source 7. During this time carriers are stored in the storage diode 16 and the capacitor 8 is charged to −24 volts. When the drive source 4 activates the arm of switch 2 it begins to move counterclockwise toward the normally open contact 10. During this time while the switch arm is in motion the charge on capacitor 8 continues current flowing. Therefore, for proper operation the RC time constant of elements 8 and 12 must exceed the transit time of the switch arm. When the arm of switch 2 contacts the ground potential of contact 10, reverse current flows through the storage diode 16 by way of diode 14 and the output as observed at junction 22 jumps from the −6 volts supplied by the source 20 to zero potential until the carriers in the storage diode 16 are consumed, at which time the output junction again drops to −6 volts. The variable impedance 12 may be utilized to adjust the forward current and thereby the output pulse width since the number of diode 16 carriers depends on the forward current.

It is therefore seen that the monopulser circuit has produced a single output pulse signal generated by the activation of a switch. Any switch or key bounce or vibration is ineffective to produce a second or erroneous output signal. Thus the stated objects of the invention have been realized by the apparatus schematically illustrated in the figure.

Referring to the figure as shown it is to be noted that the value *e* of source 20 must be less than the value of E of source 7. Also, the polarity of all diodes and voltages may be reversed to obtain a reverse polarity pulse.

It should also be realized that when the load impedance 23 is returned to the source 20, the diode 18 is not necessary in all cases. Under such conditions the pulse amplitude will be dependent on the ratio of impedances 23 and 12. As shown, the diode 18 is utilized to guarantee the D.C. level.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Apparaus for generating a single pulse from the activation of a switch having an arm and being of the type designated single pole-double throw which comprises a first potential source connected to one of the two "throw" contacts of the switch, means connecting the second of said double throw contacts to a second potential, capacitance means interconnecting the arm of the said switch and the second potential so as to place the first and second potentials across the capacitance means when the switch is in its normally closed position and which applies the said second potential to both sides of the capacitance means when the switch is in its normally open position, circuit means interconnecting the arm of said switching means with a third potential source, the said circuit means including an output terminal, a diode interconnecting the said third potential source and the said output terminal in such a manner as to present the third potential source potential at the output terminal when the switch is in its normally closed position, charge storage means and parallel circuit means serially connected between the said output terminal and the said switch arm, whereby the flow of current from the said third potential source to the first potential source causes charge carriers to be stored in the said charge storage means causing the said stored charge to alter in a singular manner the potential at the output terminal upon the movement of switch arm from the normally closed to the normally open position.

2. In an antikey switch bounce circuit the combination comprising a first potential source, a second more negative potential source and circuit means interconnecting the said first and second potential sources so as to provide a single pulse signal upon the activation of a key switch, the said circuit including a storage diode for effecting an output pulse upon the movement of the switch from the said second potential to a third potential more positive than the said first potential.

3. Apparatus for generating a single pulse upon the activation of a switch notwithstanding switch contact chatter which comprises a first potential source, a second potential source, and serial circuit means interconnecting the said first and second potential means and including diode storage means whereby normal current flow to the normally closed contact of the said switch causes current carriers to be stored in the storage diode and subsequently released upon activation of the said switch so as to cause current to reverse to permit the stored current carriers to appear at the output as a single pulse.

4. Monopulse apparatus comprising a switch, switch control means, capacitance means paralleling at least a portion of the said switch, a circuit including a device for the storage of charge carriers serially connected with the said switch, and a load circuit connected with and responsive to the said circuit whereby operation of the said switch by the switch control means generates a single output pulse which is applied to the said load, the capacitance means maintaining the charge carriers during the operation of the switch.

5. The invention according to claim 4 wherein the said circuit includes a variable impedance for controlling the width of the output pulse.

6. Apparatus for generating a single pulse from the activation of a switch having an arm and two contacts which comprises a first potential source connected to one of the two contacts of the switch, means connecting the second of said contacts to a second potential, capacitance means interconnecting the arm of the said switch and the second potential so as to place the first and second potentials across the capacitance means when the switch is in its normally closed position and which applies the said second potential to both sides of the capacitance means when the switch is in its normally open position, circuit means interconnecting the arm of said switching means with a third potential source, the said circuit means including an output terminal, a diode interconnecting the said third potential source and the said output terminal in such a manner as to present the third potential source potential at the output terminal when the switch is in its normally closed position, charge storage means arranged so that the flow of current from the said third potential source to the first potential source causes charge carriers to be stored in the said charge storage means to cause the said stored charge to alter in a singular manner the potential at the output terminal upon the movement of switch arm from the normally closed to the normally open position.

References Cited in the file of this patent

UNITED STATES PATENTS 2,982,869 Cagle ---------------- May 2, 1961

FOREIGN PATENTS 1,108,082 France ---------------- Jan. 9, 1956